United States Patent

[11] 3,578,977

[72] Inventor Samuel Natelson
 Chicago, Ill.
[21] Appl. No. 706,721
[22] Filed Feb. 19, 1968
[45] Patented May 18, 1971
[73] Assignee Rohe Scientific Corporation
 Santa Ana, Calif.

[54] REFLECTION TESTS HAVING PHOTOCELL WITH APERTURE
 6 Claims, 1 Drawing Fig.
[52] U.S. Cl. .................................................. 250/219,
 356/200, 356/237
[51] Int. Cl. .................................................. G01n 21/30
[50] Field of Search ........................................ 250/219
 (ID), (IA) (IOF) (IWEB); 356/200, 237

[56] References Cited
 UNITED STATES PATENTS
3,058,004 10/1962 Domizi et al .................. 250/219

Primary Examiner—Ralph G. Nilson
Assistant Examiner—Martin Abramson
Attorney—George B. Oujevolk ABSTRACT: An instrument with supporting structure for reading relative density of flat spots and the concentration of substances in that spot, comprising in combination, a detector photocell with a small aperture in its center said photocell being supported in a plane parallel to that of the flat spot to be examined and in close proximity thereto, the light sensitive surface of the photocell facing said spot; a light source and lens combination so placed in back of the photocell as to focus a light beam at the aperture in the photocell, said light beam traversing said aperture to form a spreading light beam in front of the photocell so that emission of light from the spot will strike the photocell, causing a change in current in relationship with the density of the spot, and, electrical connecting means from said photocell for connection to readout means to sense the signal from the photocell.

Patented May 18, 1971
3,578,977
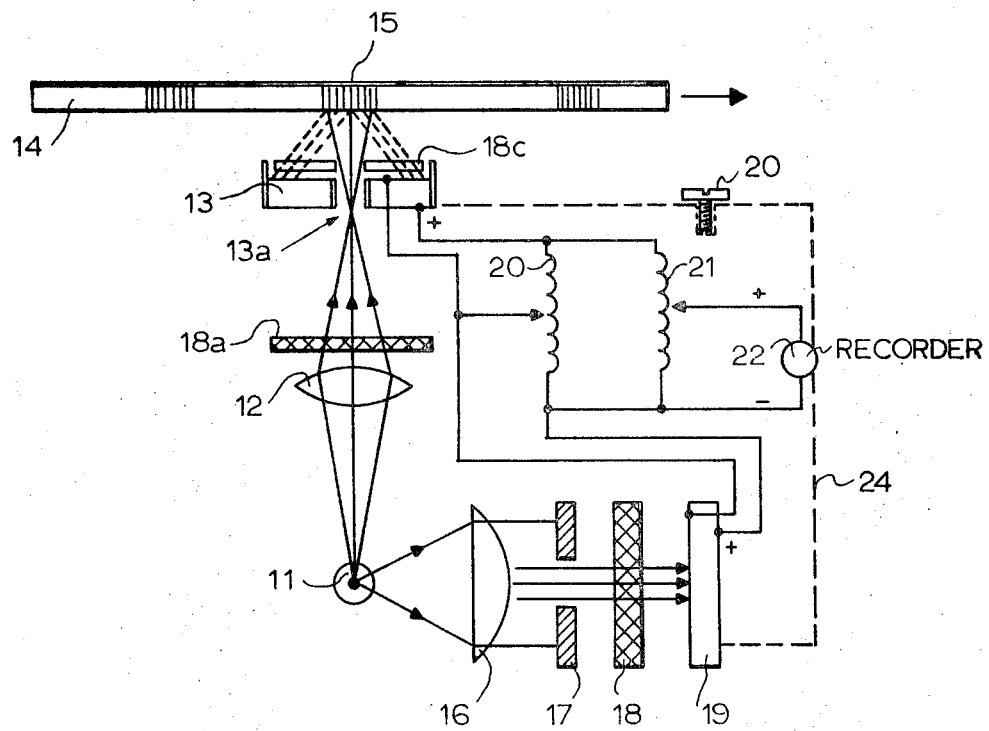
BY SAMUEL NATELSON
INVENTOR.
George B. Oujevolk
ATTORNEY

REFLECTION TESTS HAVING PHOTOCELL WITH APERTURE

The present invention relates to an instrument for evaluating the intensity of spots on a supporting medium by reflectance or fluorescence, and more particularly to a readout instrument for use at a readout station in an apparatus for automatic chemical analysis.

Heretofore, the manner of accomplishing this objective consisted in irradiating a spot with a monochromatic source of light at an angle. The reflectance from the spot as compared to its surroundings is evaluated by placing a light detector at an angle to receive the image. Because of problems with the geometry of the system the length of light path from the source to the detector is necessarily long because the source cannot block the emitted light from the spot. In typical instrumentation, for example, that sold commercially, the light source is a bulb with a collimating lens in front of it and a light filter. The light source is placed at an angle of 45° to the spot and approximately 8 inches from the spot. Facing downward is placed a photomultiplier tube with its face parallel to the spot and directly above it. This is approximately 9 inches away from the spot. Thus the light path travels a total of 17 inches. Since intensity of light decreases as the square of the distance, the light from the spot is so attenuated that a photomultiplier tube needs to be used to detect it. Even so, sensitivity is low and faint spots cannot be detected with any reasonable degree of accuracy. By using the instrument of the present invention, it is possible to produce large changes in readings for even the faintest of spots barely detectable by the human eye. As compared with systems of the prior art, the sensitivity of the system herein described is several orders of magnitude greater.

The invention as well as other objects and advantages will be better understood from the following detailed description and the accompanying drawing wherein:

FIG. 1 is a schematic and sectional explanation of the inventive concept.

The present invention is best illustrates when for reading a specimen spot which has been treated in an apparatus for chemical analysis, e.g., such as described in the Samuel Natelson U.S. Pat. No. 3,038,893 after a sample spot 14a has been placed on a reagent containing tape 14 and/or otherwise further treated, the spot 14a on the tape 14 is brought to a readout station. Here, the spot 14 is read by the instrument just described wherein the detector is at an angle to the plane defined by the tape. Light from a source 11 is collimated in a collimating lens 12 disposed in a plane parallel to that defined by the moving tape 14 at the readout station 15. The light passes through a first filter 18a, also disposed in a plane parallel to said defined plane. The focal point 13a of the lens 12 is located in an aperture in a photocell 13, also disposed in a plane parallel to the defined plane with the active side thereof facing the tape 14. Between the photocell 13 and the tape 14 is a second filter 18c also with central aperture aligned with the photocell aperture for the passage of the collimated light therethrough. This light will then strike the spot 14a at readout station 15 and be reflected back through the second filter 18c onto the photocell 13.

The system can best be understood from the drawing wherein there is a light source 11 usually an incandescent bulb activated by a battery or the house current. No constant voltage regulator need be used. In front of the light source 11 is a collimating lens 12. The lens focal point at 13a is equivalent from the center of the lens with the light source. The law governing the location of the light source relative to the focal point is given by the equation $1/Q + 1/P = 1/S$ where Q is the distance to the light source from the center of the lens, P is the distance of the focal point 13a from the center of the lens and S is the focal length of the lens. When P=Q, the distance from light source to focal point 13a becomes a minimum and the distance from 11 to 12 or from 12 to 13a is twice the focal length. Thus, with a lens of 2 cm. focal length the distance from 11 to 13a is 4S or 8 cm. which is approximately 3½ inches. With lenses of shorter focal length, proportionately smaller distance can be achieved.

The photocell 13 is preferably a selenium photocell of circular shape and approximately 1 inch in diameter so as to be able to measure spots of approximately 15 cm. in diameter at a readout station 15. For large spots, a larger photocell may be used. Through the center 13b of this photocell is drilled a small hole three thirty-second inches in diameter through which the light passes and then spreads out. A tape 14 which in this case is backed with mylar is being pulled in the direction shown, across the beam of light for scanning. This tape is fixed at a distance such that the light beam will encompass the spot. By moving the tape further away the illuminated area increases. Generally the tape is placed one-fourth inches from the photocell.

A light filter 18a insures that monochromatic light is being used. A secondary light filter 18b is also used and has a three thirty-second inches hole drilled in its center and aligned with the hole in the photocell. For reflectance measurements this filter 18c is of the same wavelength as first filter 18. For fluorescence measurements first filter 18a is the exciting wavelength while second filter 18c is of the emitting wavelength. For example, for fluorescence first filter 18a would be 410 mu and 18c would be 600 mu, if porphyrins were being measured. The colored specimen spot is indicated by the number 15.

The light source needs to be constant if one photocell is used as described above. For this purpose a constant voltage needs to be supplied to the lamp. A preferred system is to balance the output of the detector photocell 13 with a second photocell 19 called a reference cell. A diaphragm 17 attenuates the light collimated by second lens 16 so that the amount of light reaching the reference photocell approximates that reaching the detector photocell. A light filter 18b is of the same wavelength as light filter 18a. The output of the two cells may and can be compared. The two negative leads from the photocell are jointed together to the wiper of balancing potentiometer 20. The positive leads are then connected to opposite ends of potentiometer 20. As the wiper is moved back and forth a balance is achieved so that the voltages at the both ends of the potentiometer 20 are equal algebraically. That is in sign and quantity. The two ends of balancing potentiometer 20 are attached to both ends of attenuating potentiometer 21. The wiper and lower end of this attenuating potentiometer 21 are attached to a recorder 22. With the wiper of the attenuating potentiometer 21 at its maximum, the balancing potentiometer is adjusted so that the output is zero, when the light is striking a clear area of the paper or other support of the spot such as fiberglass or gel. An opaque object is inserted in place of filter 18a so that no light reaches the spot. A voltage develops at the wiper of potentiometer 21 which is negative since only the reference cell is generating a current. The leads are reversed to the recorder. The wiper of 21 is then moved down until the needle on the recorder 22 reads full scale or 100. This signifies that 100 percent of the light has been removed. The wiper of 21 is left in this position and spots are replaced at readout station 15. The percentage of light reaching the photocell as compared to that when the spot is not present is a measure of the density of the spot.

For fluorescence measurements, the readings of the spots will be higher than that of the background. The instrument is then zeroed as before with the balancing potentiometer using the clear background at position 15. With the leads from potentiometer 21 in normal position on the readout device the highest reading standard is placed in the field at position 15. The attenuating potentiometer 21 is then adjusted for a readout of 100. The other specimens will be read as a percentage of the high standard.

The various components are held in their relative position by supporting means 24, which can be adjusted, e.g., by screws 25.

It will be observed therefore that the present invention provides a readout arrangement, e.g., a densitometer, with associated supporting structure for reading relative density of spots and thus the concentration of substance in that spot which comprises in combination a detector photocell with small aperture in its center said photocell being supported close to a spot to be examined with the photocell's light sensitive surface facing the spot; a light source and lens combination so placed in back of the photocell as to focus a light beam at the aperture in the photocell said light beam traversing said aperture to form a spreading light beam in front of photocell so that emission of light from the spot will strike said photocell causing a change in current in relationship with the density of the spot and, electrical leads from said photocell to readout means to sense the signal from said photocell. A light filter is disposed in front of the lens to form monochromatic light. To pass excitation light onto the specimen a second filter is disposed between the specimen and the photocell. This second light filter also has an aperture which is aligned with the photocell aperture and disposed so as to filter light reflected from the specimen spot on a tape back to the photocell. A second lens, photocell, two filter and blank redundant system may be used to balance the first system by means of a balancing potentiometer arrangement. In this way, variations in intensity of the light source may be compensated. The arrangement may further include a balancing potentiometer for adjusting balance of the two cells and an attenuating potentiometer for matching the signal to the span of the readout instrument. The position of spot is preferably adjustable to adjust size of beam of light hitting the spot. This is done either by adjusting the structure supporting the readout device or the structure supporting the tape. The light source may consist of a heated filament in the shape of a line. Substituting a cylindrical lens for the lens at part number 12, and an elongated slit for the circular hole in the photocell at 13, a spreading beam of light reaches the spot at 15, of constant height. This pencil of light is advantageous for scanning elongated spots.

Thus, the system of the prior art had low sensitivity because of a long light path and only a fraction of the light was read, requiring a photomultiplier tube with its incidental stable power supply which makes the system unstable in reality, and the light source had to have a constant voltage power supply, and, the adjustable feature of the prior art system was achieved for a change in spot size by opening a diaphragm so that small spots got less light than large spots. The present system on the contrary provides high sensitivity, short light paths and practically all emitted light reaches the photocell. Furthermore, it is possible to use a simple cell system, e.g., selenium, germanium, silicon, which does not require a special power supply or a stable thallium cell with a simple power supply system. With the redundant system, no constant voltage light source is needed since the reference cell corrects for fluctuations in the light source. The arrangement is adjustable for change in spot size by physically movement of the spot or readout system, closer to or further away from the cell. The total light on a spot remains constant and a small spot receives the full intensity of the beam. In the present invention instrument ordinary selenium or silicon barrier-type photocells are used. This results in increased stability since no power supply delivering constant voltage, as required by the photomultiplier tube arrangement is needed. The light path from the light source to the detector is a distance of less than 2½ inches. In the photomultiplier arrangement only a small cone of light emitted from the spot corresponding to approximately 5°—10° out of a possible 180° reaches the detector. In the present system over 95 percent of the light emitted from the spot reaches the detector.

The system permits ready comparisons with the surrounding area or background of the spot and results are read out as a percentage of the decrease in light reflected from the background without the spot.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An instrument for reading relative density of flat spots and the concentration of substances in such spots, comprising in combination, a detector photocell with a small aperture in its center said photocell being supported in a plane parallel to that of the flat spot to be examined and in close proximity thereto, the light sensitive surface of the photocell facing said spot; a light source and lens combination so placed in back of the photocell as to focus a light beam at the aperture in the photocell, said light beam traversing said aperture to form a spreading light beam in front of the photocell so that emission of light from the spot, will strike the photocell, causing a change in current in relationship to the density of the spot, and, electrical connecting means from said photocell for connection to readout means to sense the signal from the photocell.

2. An instrument as claimed in claim 1 including a light filter supported by said structure disposed in front of the lens to form monochromatic light.

3. An instrument as claimed in claim 2 including a second filter disposed between the spot and the photocell said second filter having an aperture axially aligned with the photocell aperture and disposed so as to filter light reflected from the spot back to the photocell.

4. An instrument as claimed in claim 3 including a redundant system comprising a second set of photocell, lens, and filters corresponding to said lens combination, light filter and second filter, so disposed that said second photocell receives an input from a predetermined standard, and, balancing means to compare the outputs of the first and second photocells.

5. An instrument as claimed in claim 4 said balancing means including first and second potentiometers disposed in parallel between the photocell outputs, said first potentiometer serving to balance the output between the two photocells, said second potentiometer serving to match the electrical output to the range of a readout instrument, and, electrical leads for coupling said second potentiometer to a readout instrument.

6. An instrument as claimed in claim 1 wherein the aperture is an elongated slit and the lens combination includes at least one cylindrical lens, the light source being a line source.